United States Patent [19]

Magnusson

[11] 4,433,617

[45] Feb. 28, 1984

[54] APPARATUS FOR PREPARING AND DISPENSING BEVERAGES

[75] Inventor: Jan Magnusson, Mariestad, Sweden

[73] Assignee: Jede-Automater Magnusson AB, Mariestad, Sweden

[21] Appl. No.: 228,467

[22] Filed: Jan. 26, 1981

[30] Foreign Application Priority Data

Jan. 31, 1980 [DE] Fed. Rep. of Germany ... 8002412[U]

[51] Int. Cl.³ .......................... A47J 31/00; A47J 31/40
[52] U.S. Cl. .......................................... 99/305; 99/295
[58] Field of Search ................. 99/295, 304, 305, 300, 99/302 R, 307, 316, 317, 290, 291, 293, 294, 306; 251/6, 9

[56] References Cited

U.S. PATENT DOCUMENTS

| | | | |
|---|---|---|---|
| 2,617,352 | 11/1952 | Olson | 99/305 |
| 2,676,585 | 4/1954 | Pappas | 99/305 |
| 3,443,508 | 5/1969 | Reynolds | 99/295 |
| 3,590,724 | 7/1971 | Lorang | 99/295 |
| 3,805,830 | 4/1974 | Smith | 251/9 |
| 4,207,809 | 6/1980 | Brill | 99/295 |

*Primary Examiner*—Robert W. Jenkins
*Attorney, Agent, or Firm*—Dann, Dorfman, Herrell and Skillman

[57] ABSTRACT

An apparatus for preparing and dispensing beverages having a hot water tank (3) with an outer tap and a magazine (12) for containers filled with various additives, e.g. tea and coffee extract, and having each a device for feeding out a certain portion of its contents. According to the invention, a separate or affiliated tank (5) is provided within said main tank (3). Said affiliated tank has its own outlet pipe (8), which can be shut off by a shut off device (7). Below the mouth of said pipe, a filter funnel (9) and a receptacle (10) can be inserted.

5 Claims, 4 Drawing Figures

APPARATUS FOR PREPARING AND DISPENSING BEVERAGES

The present invention concerns an apparatus for preparing and dispensing beverages.

Apparatus of this kind is previously known by DE-PS (W. German Patent) No. 1 910 460.

One object of the present invention is further improvement of such known apparatus and to create a technical basis for new possibilities of use. According to further objects of the invention, this should be done as appropriately, simply, cheaply and energy saving as possible.

The preceding objects are achieved according to the invention in such a way, that an apparatus of the initially defined kind is constructed substantially as described. Such apparatus has already been tested and test results show, that the expectations in such an apparatus according to the invention are fully complied with.

Further characteristics of and advantages with the invention are revealed by the following specification with reference to the accompanying drawings, which show non-limiting examples.

Figure 1:
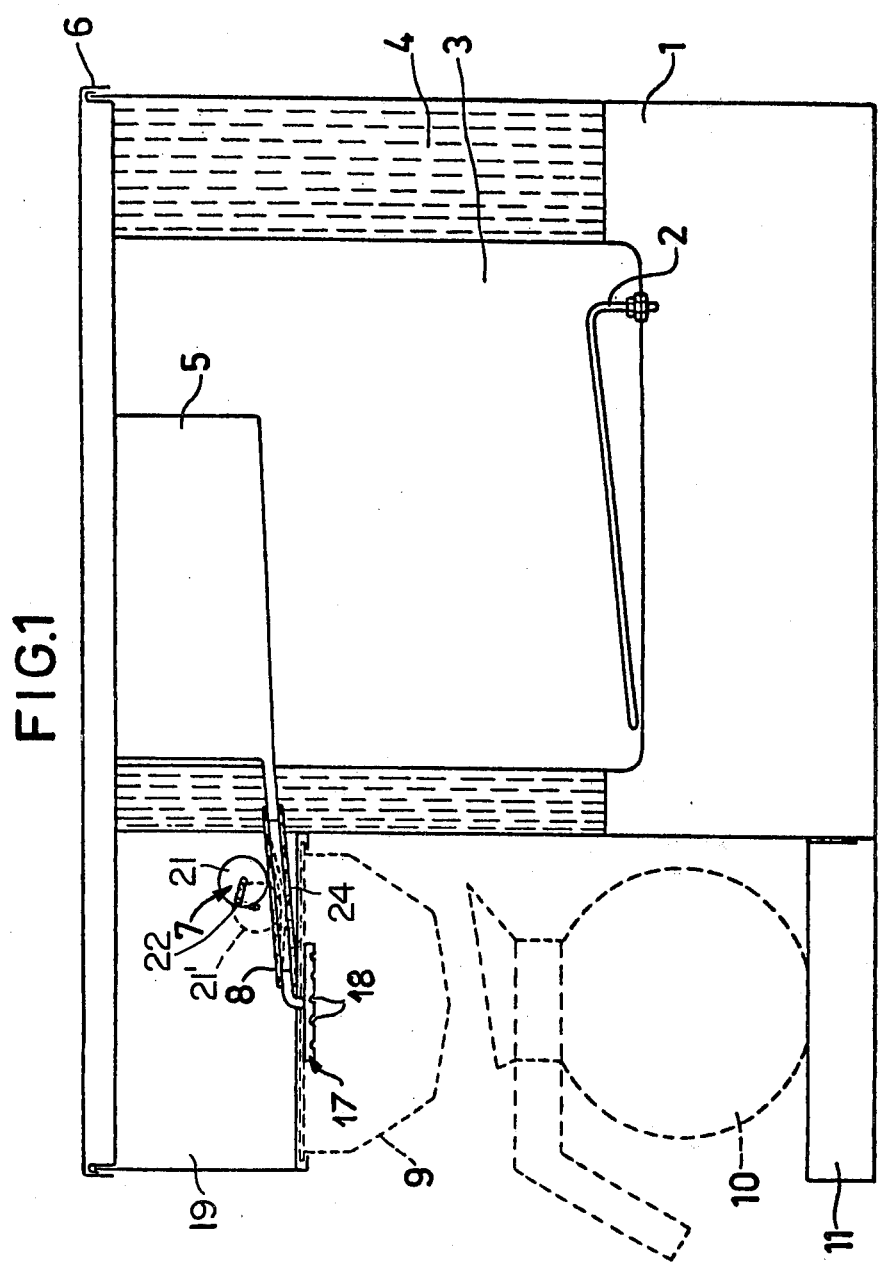
FIG. 1 shows diagrammatically an apparatus for preparing and dispensing beverages according to the invention in a partly sectional front view.

In the drawings, 1 refers to a housing of the apparatus according to the invention, which housing preferably is shaped blocklike, whereby a lid 6 terminates said housing at the top and a preferably protruding leak trough 16 does the same at the bottom. Hereby, said lid can be pivotable as shown and said leak trough can be provided entirely or partly removable.

The front of the housing is preferably provided with a magazine 12 for containers with powderlike goods being known per se and having for instance each a device for feeding out a portion. At one side, a tap 15 can be provided leading to a main tank 3 with an electrical heating element 2 within said housing. Said tank can have a volume of 10–20 liters and is preferably surrounded by a thermal insulation 4.

According to a first characteristic of the invention, within said main tank 3, there is provided an affiliated tank 5 having a volume of e.g. up to 5 liters. Separate fill openings are provided at 3' and 5'.

Said affiliated tank 5 can have an inclined bottom, to which is connected an outlet pipe 8, which terminates centrically downwardly in an upper protrusion 19 at one side of the said housing, below which protrusion a filter funnel 9 can be inserted, below which a receptacle 10 for e.g. coffee can be loosely provided, which receptacle in its turn is supported by e.g. a hot plate or just by a lower protrusion 11 at the same side of said housing.

Figure 2:
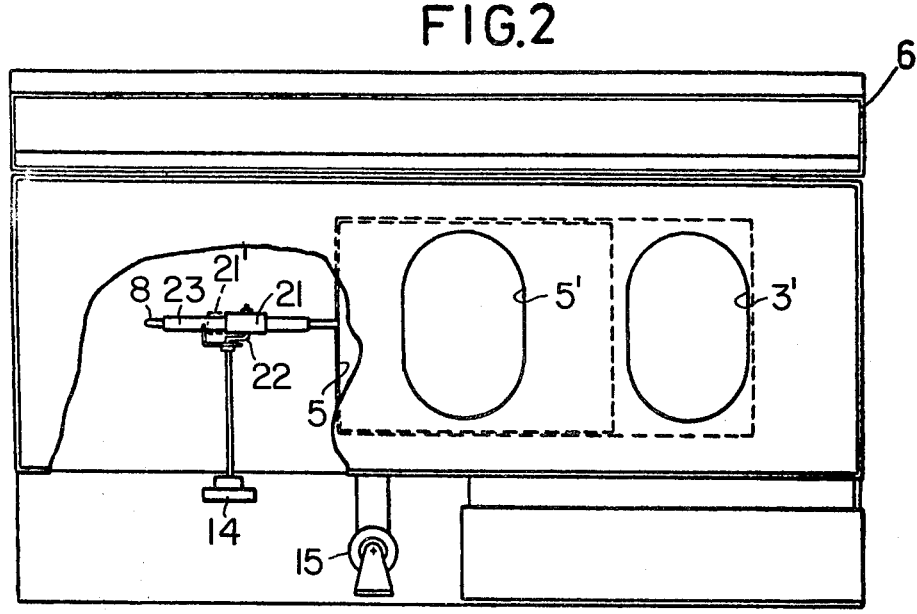
FIG. 2 shows the same apparatus in plan with parts broken away, and with the lid open.
Figure 4:
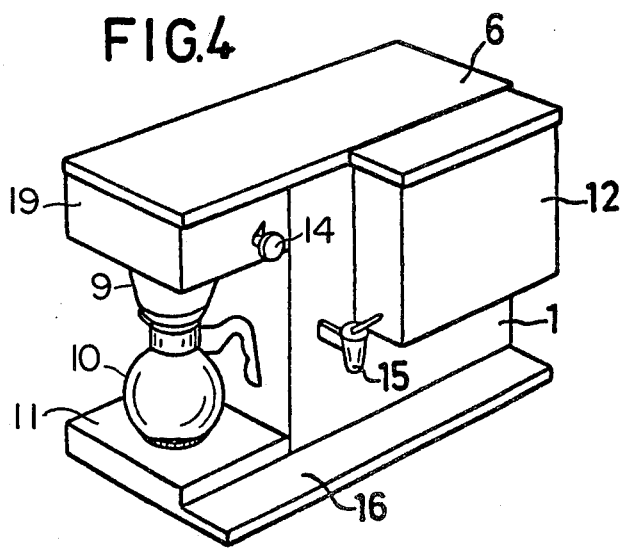
FIG. 4 shows the apparatus of FIG. 1 in a perspective view.

On the way to its mouth, said pipe 8 is provided with a shut-off device 7, especially as revealed by FIG. 2. This device can in accordance with a preferred embodiment be a disc 21 having an eccentrically bended pivot or crank 22, which leads to a set button or actuation 14 at the front of the housing, which can be provided with an index or the like. In this area, said pipe 8 can be flexible, especially as heat resistant plastic material 23. By turning said button clockwise according to FIG. 2, said disc 22 will be moved against said pipe and will finally compress said pipe entirely, whereby somewhat beyond the dead point of said eccentric pivot or crank part 24, an angled part will provide a safe arrest in this position as indicated at 21'. Hereby, hot water from main tank 3 can be tapped in desired quantity into the affiliated tank 5, so that an exactly measured quantity of e.g. coffee can be prepared. The shut-off device device 7, and control 14 is intended for temporary shutting off pipe 8, while water is poured in and for instance a receptacle and a filter funnel with a filter and coffee powder haven't been provided yet.

According to a preferred embodiment, the diameter of pipe 8 is at least partially such, that a somewhat greater flow can be achieved than that through the provided device for filtering coffee.

Naturally, instead of the illustrated shut-off device as shown and described, an entirely different device can be provided or it is even possible to disregard such device.

Furthermore, it is of course possible, to equip the affiliated tank with a special heating element, whereby for instance at the boiling of water, the generated steam pressure may be used to push out the boiling water against a valve, e.g. a check valve, or in any other way into the filter funnel 9.

Figure 3:
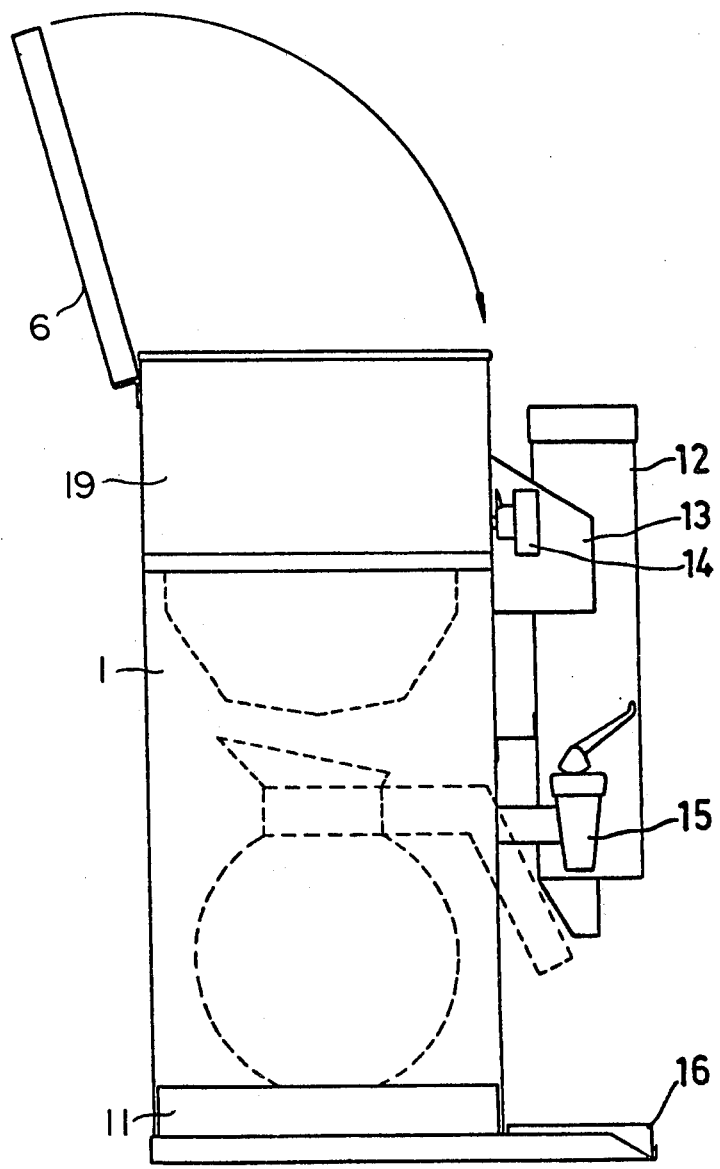
FIG. 3 shows the same apparatus from the left in FIG. 1 with the lid open, and with a spoon magazine added.

In FIG. 3, 13 designates a spoon magazine. The apparatus according to the invention can of course be completed and moderated in many ways.

Summarizing, following can be stressed: by provision of an affiliated tank within a main tank, it will generally not be necessary to provide a special heating element in the affiliated tank, which preferably is provided in heat-conducting relationship within the main tank well. By such a combination, one always has the possibility of either simultaneously or separately having hot water for various purposes, like in the illustrated example for brewing coffee in an exactly measured quantity and for preparing other beverages, for which hot water can be tapped in desired quantity at the tap, whereupon from one of said containers of said magazine, an e.g. granulated additive as for instance tea extract or the like can be added before or after. Such a device according to the invention offers many alternatives for a consumer at highly simple construction, so that hot water for two different purposes and in the required way always will be at disposal.

Naturally, the affiliated tank can be constructed and provided in any way and at any place within the main tank. Furthermore, the mouth of pipe 8 can terminate in a disperser 17, e.g. a tube or plate with holes 18 for dispersing the hot water over the funnel 9.

I claim:

1. Apparatus for preparing and dispensing beverages having a preferably block-like housing and therein a tank for hot water and means for tapping water, characterized in that said tank is arranged as a main tank in which there is provided an affiliated tank for hot water, said means for tapping water comprising a tap connected into the main tank, and a special pipe connected into the bottom of said affiliated tank, said special pipe having a manual shut-off device to control tapping said affiliated tank, said housing having an upper protrusion at one side of said housing, said special pipe being within said upper protrusion to discharge water centrally and downwardly from said upper protrusion, and means below said protrusion to mount a filter funnel to receive the discharged water, and below said filter funnel mounting means, a lower protrusion at the same side of the housing respectively for mounting a receptacle.

2. Apparatus according to claim 1, characterized in that the manual shut-off device comprises a crank, an eccentrically mounted disc, an actuator, a flexible pipe part, and an angled part underlying said flexible pipe part, said disc, when in shut-off position somewhat beyond the dead point of the eccentric crank, compressing said pipe part against said angled part, so that said part safe-guards this position.

3. Apparatus according to claim 1, wherein said special pipe terminates in a disperser comprising a member with holes for dispersing the hot water over the interior of the funnel.

4. Apparatus according to claim 1 including displaceable lid means for said housing and separate fill openings for said main tank and said affiliated tank under said lid means.

5. Apparatus according to claim 1 including a magazine for dispensing different additives which may be added to hot water.

* * * * *